UNITED STATES PATENT OFFICE 2,568,036

PLANT GROWTH REGULANT COMPOSITIONS CONTAINING HALOARYL SULFONYL SULFIDES

William D. Stewart, Brecksville, Ohio, assignor to The B. F. Goodrich Company, New York, N. Y., a corporation of New York No Drawing. Application April 6, 1950, Serial No. 154,442

5 Claims. (Cl. 71—2.3)

This invention relates to plant growth regulants and pertains particularly to compositions which alter or regulate the growth of plant cells by reason of their containing as an essential active ingredient haloaryl sulfonyl sulfides and the methods in which the growth characteristics of plants are modified by the application of such compounds.

I have discovered that haloaryl sulfonyl sulfides have a marked effect on plant cell growth and that compositions containing such a compound as an active ingredient, together with an inert carrier, are useful in a variety of ways to regulate the growth characteristics of plants.

For example they may be applied to seeds and tubers (which for the purposes of this invention are to be regarded as plants in the dormant stage) to stimulate germination and plant emergence or to inhibit sprouting or to stimulate development of roots; they may be applied to cuttings and transplants to stimulate root formation and root growth; they may be applied to fruit trees to reduce the number of set fruit or to delay or prevent premature drop of buds, leaves and fruit or to ornamental plants to delay fall of leaves and needles; they may be used for fortifying fertilizers and plant food to enhance growth and increase yields of various agricultural products; they may be used to induce modifications in leaf structure to enhance productivity of a variety of plants; they may be used to induce parthenogenesis and thereby aid in the development of seedless berries and fruit; and they may be employed in various other ways to produce useful histogenic and morphogenic changes in plants. In such applications compositions containing from about 0.01% to 1% by weight of the active ingredients are applied to at least some of the cells of the living plant structure, whether dormant or in active state of development or growth, and the plant structure is thereafter maintained under conditions normally favoring development or growth. Compositions containing higher concentrations of the active ingredient, from about 1% to 10% by weight, so alter the growth characteristics of actively growing plants upon which they are applied as to cause the death of such plants, hence such compositions are useful as herbicides.

The haloaryl sulfonyl sulfides which are the active ingredients of the compositions of this invention can be illustrated by the following general formula:

where Y and Y' are halogenated aryl groups preferably having from 6 to 10 carbon atoms and from 2 to 10 halogen atoms, and where $n$ is an integer from one to four. Y and Y' may be the same or they may be different haloaryl groups. When Y and Y' are the same haloaryl group, the compound is then a bis-haloaryl sulfonyl sulfide.

The monosulfides, where $n$ is 1, are prepared by reacting a haloaryl sulfonic acid chloride with a salt of a haloaryl thiosulfonic acid. The haloaryl sulfonyl monosulfide and a chloride salt are formed. This reaction can be illustrated by the following equation:

(1) 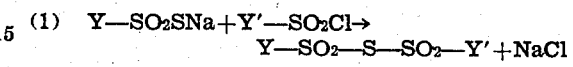

where Y and Y' have the same significance as described above and where sodium is employed to illustrate the cation of the salt of the thiosulfonic acid.

The disulfides, where $n$ is 2, can be prepared by the oxidation of a thiosulfonic acid or a salt of a thiosulfonic acid or the simultaneous oxidation of two different thiosulfonic acids or the salts of two different sulfonic acids. The following equation illustrates the oxidation of thiosulfonic acids:

(2) 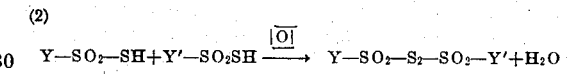

where Y and Y' have the significance as described above in the general formula.

The trisulfides, where $n$ is 3, can be prepared by reacting $SCl_2$ with a sodium haloaryl thiosulfonate or a mixture of sodium haloaryl thiosulfonates. The reaction takes place according to the following equation:

(3) 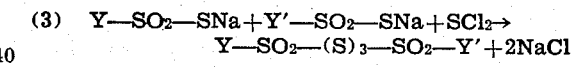

where Y and Y' are haloaryl radicals.

The tetra sulfides, where $n$ is 4, can be prepared by reacting the haloaryl thiosulfonyl disulfide with chlorine to form two molecules of the haloaryl thiosulfonyl chloride and then reacting the sulfonyl chlorides with sodium disulfide to form the tetra sulfide and two moles of sodium chloride. This preparation can be represented by the following equations:

(4a) 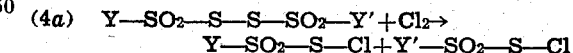
(4b) 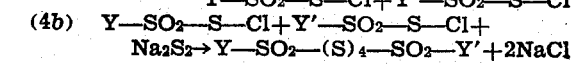

where Y and Y' are haloaryl radicals.

Another method which can be employed to prepare the tetra sulfides is to react a sodium haloaryl thiosulfonate or a mixture of sodium haloaryl thiosulfonates with $S_2Cl_2$. Two moles of sodium chloride are also formed as a by-product in this reaction as indicated by the following equation:

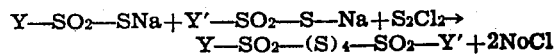

Among the haloaryl sulfonyl sulfide compounds illustrated by the general formula hereinbefore set forth there are for example such specific compounds as bis-(p-fluorobenzene sulfonyl) mono-, di-, tri-, and tetra-sulfides; bis-(p-bromobenzene sulfonyl) mono-, di-, tri-, and tetra-sulfides; bis - (p - iodobenzene sulfonyl) mono-, di-, tri-, and tetra-sulfides; bis-(p-chlorobenzene sulfonyl) mono-, di-, tri-, and tetra-sulfides; bis - (2,4 - dibromobenzene sulfonyl) mono-, di-, tri-, and tetra-sulfides; bis-(2,4-diiodobenzene sulfonyl) mono-, di-, tri-, and tetra-sulfides; bis-(2,5-dibromobenzene sulfonyl) mono-, di-, tri- and tetra-sulfides; bis-(3,4-dibromobenzene sulfonyl mono-, di-, tri- and tetra-sulfides; bis-(2,4-dichlorobenzene sulfonyl) mono-, di-, tri- and tetra-sulfides; bis-(2,5-diiodobenzene sulfonyl) mono-, di-, tri- and tetra - sulfides; bis - (3,5 - difluorobenzene sulfonyl) mono-, di-, tri- and tetra-sulfides; bis-(2,4,6-tribromobenzene sulfonyl) mono-, di-, tri- and tetra-sulfides; bis-(2,4,6-trichlorobenzene sulfonyl) mono-, di-, tri- and tetra-sulfides; bis-(4-iodo-m-toluene sulfonyl) mono-, di-, tri- and tetra-sulfides; bis-(4-chloro-m-toluene sulfonyl) mono-, di-, tri- and tetra-sulfides; bis-(6-bromo-m-toluene sulfonyl) mono-, di-, tri- and tetra-sulfides; bis-(4,5-dichloro-m-toluene sulfonyl) mono-, di-, tri- and tetra-sulfides; bis-(4,5-dibromo-m-toluene sulfonyl) mono-, di-, tri- and tetra-sulfides; bis-(4-fluoro-o-toluene sulfonyl) mono-, di-, tri- and tetra-sulfides; bis-(3-bromo-o-toluene sulfonyl) mono-, di-, tri- and tetra-sulfides; bis-(3,4-dibromo-o-toluene sulfonyl) mono-, di-, tri- and tetra-sulfides; bis-(3,4-dichloro-o-toluene sulfonyl) mono-, di-, tri-, and tetra-sulfides; bis - (3,5 - dichloro - o - toluene sulfonyl) mono-, di-, tri- and tetra-sulfides; bis-(5,6-dichloro-o-toluene sulfonyl) mono-, di-, tri- and tetra-sulfides; bis-(4,6-dichloro-o-toluene sulfonyl) mono-, di-, tri- and tetra-sulfides; bis-(2-bromo-p-toluene sulfonyl) mono-, di-, tri- and tetra-sulfides; bis - (3 - chloro - p - toluene sulfonyl) mono-, di-, tri- and tetra-sulfides; bis-(5-iodo-p-toluene sulfonyl) mono-, di-, tri- and tetra-sulfides; bis-(5-bromo-p-toluene sulfonyl) mono-, di-, tri- and tetra-sulfide; bis-(2,3-dichloro-p-toluene sulfonyl) mono-, di-, tri- and tetra-sulfide; bis - (2,3 - dibromo - p - toluene sulfonyl) mono-, di-, tri- and tetra-sulfide; bis-(2,6-dichloro-p-toluene sulfonyl) mono-, di-, tri- and tetra-sulfide; bis-(3-bromo-5-pseudocumene sulfonyl) mono-, di-, tri- and tetra-sulfide; bis-(3-chloro-5-pseudocumene sulfonyl) mono-, di-, tri- and tetra-sulfides; bis-(3-chloro-2,4-xylene sulfonyl) mono-, di-, tri- and tetra-sulfides; bis-(4-chloro-2,5-xylene sulfonyl) mono-, di-, tri- and tetra - sulfides; bis - (3 - bromo - 2,6 - xylene sulfonyl) mono-, di-, tri- and tetra-sulfides; bis-(3-chloro-2,6-xylene sulfonyl) mono-, di-, tri- and tetra-sulfides; bis-(2,4-dichloro-1-naphthalene sulfonyl) mono-, di-, tri- and tetra-sulfides; 2,4 - dichlorobenzene sulfonyl - 2,6 - dichloro - p - toluene sulfonyl mono-, di-, tri- and tetra-sulfides, among others.

Compositions containing such compounds useful for plant regulating purposes include solutions in organic solvents, aqueous compositions and dusts and can be readily and conveniently prepared as hereinafter described. Solutions in organic solvents containing any of the active ingredients hereinbefore named are prepared by dissolving a sufficient amount of the active ingredient in an appropriate organic solvent to give the desired concentration. Such solvents as the alcohols, acetone, liquid petroleum fractions, benzene and the like, will, in general, be found to be useful solvents. Where the solution is to be used to stimulate plant cell growth as in root initiation or to prevent drop of mature fruit, a non-phytotoxic solvent should be used.

Aqueous compositions can be prepared with or without a wetting or dispersing agent. Where aqueous compositions which do not contain a wetting agent are desired the active ingredient is first dissolved in the smallest amount of water-miscible solvent in which the active ingredient will dissolve and then this solution is added to sufficient water to obtain the desired concentration of the active ingredient. Ethyl alcohol and acetone are excellent solvents for this preparation. Two other types of aqueous compositions can be prepared and both of these contain a wetting or dispersing agent. One type is prepared by dissolving the active ingredient in a water-immiscible solvent such as kerosene and then dispersing the resulting solution in an aqueous solution of a wetting or dispersing agent. The other type is prepared by dispersing the active ingredient in an aqueous solution of a wetting or dispersing agent.

Dusts also can be prepared with or without a wetting or dispersing agent. But the dust formulations containing wetting or dispersing agents (surface active agents) are preferred. In preparing the dust formulations, the active ingredient is uniformly dispersed throughout the entire mass of a finely-divided pulverulent solid such as talc, diatomaceous earths, clays or calcium carbonate by grinding the materials together in a ball mill or pebble mill or any other mechanical device. When a surface active agent is used, it can be mixed in with the inert solid together with the active ingredient in the manner described above.

Suitable dispersing or wetting agents which can be used to prepare the above-described compositions can be typified by the following general classifications: sodium and potassium salts of fatty acids known as soft and hard soaps; salts of disproportionated or hydrogenated abietic acid known as rosin soaps; salts of the hydroxyaldehyde acids present in seaweed known as algin soaps; alkali-casein compositions; water-soluble lignin sulfonate salts; long-chain alcohols usually containing 10 to 18 carbon atoms; water-soluble salts of sulfated fatty alcohols containing 10 to 18 carbon atoms; water-soluble salts of sulfated fatty acid amides; water-soluble esters of sulfated fatty acids; water-soluble alkyl sulfonates having on the average of 16 carbon atoms in the alkyl group; water-soluble aryl sulfonates; water-soluble alkyl aryl sulfonates; water-soluble aralkyl sulfonates; water-soluble sorbitan mono-laurate, -palmitate, -stearate, and -oleate; quaternary ammonium alkyl halides; fatty acids saponified with amines and amino alcohols; blood albumen; and others. These materials are sold under numerous trade names either as pure compounds or mixtures of compounds of the same class and mixtures of these compounds with fillers or diluents.

When the above dispersing or wetting agents are employed to prepare the plant growth regulating compositions containing haloaryl sulfonyl sulfides as active ingredients, it will be necessary to use only from 0.01% to about 1% by weight of the wetting or dispersing agent depending on the efficiency of the specific dispersing or wetting agent.

The following specific examples illustrate the compositions of this invention and their activity.

EXAMPLE I

Terminal cuttings of chrysanthemums about six inches long were treated with aqueous mediums in an attempt to initiate rooting of the cuttings. Twenty cuttings were dipped in an aqueous composition containing 0.025% by weight of bis-(2,5-dichlorobenzene sulfonyl) monosulfide and 0.1% by weight of blood albumen. Twenty cuttings were dipped in an aqueous solution containing 0.1% by weight of blood albumen. These cuttings were planted in marked plots in moist sterilized sand in a greenhouse and were watered daily beginning 24 hours after planting. Twelve days after planting, the cuttings were carefully removed by washing the sand away from the cuttings and the extent of root growth was observed. All the cuttings treated with the composition containing bis-(2,5-dicholorbenzene sulfonyl) monosulfide had numerous uniform and heavy root growth while the cuttings treated with the aqueous solution of blood albumen had a few sparse roots.

EXAMPLE II

Twenty terminal chrysanthemum cuttings about six inches long were dipped into an aqueous composition containing 0.025% by weight of bis-(2,5-dichlorobenzene sulfonyl) disulfide and 0.1% by weight of blood albumen. Another twenty chrysanthemum cuttings about six inches long were dipped into an aqueous composition containing 0.1% by weight of blood albumen. These forty cuttings were planted in marked plots in moist sterilized sand in a greenhouse and were watered daily beginning 24 hours after planting. Twelve days later the cuttings were carefully removed by washing the sand away from the cuttings and the root growth was observed. All the cuttings treated with the composition containing bis-(2,5-dichlorobenzene sulfonyl) disulfide had numerous uniform and heavy root growth while the cuttings treated with the aqueous solution of blood albumen had a few sparse roots.

EXAMPLE III

Bean and tomato seeds treated with an aqueous dispersion containing 0.01% by weight of bis-(2,5-dichlorobenzene sulfonyl) disulfide and 0.1% of blood albumen will germinate and emerge 10 days after planting while untreated under the same conditions seeds take 15 days to germinate and emerge.

EXAMPLE IV

Young potted bean plants which are dipped for 30 seconds in an aqueous dispersion containing 0.1% of bis-(2,5-dichlorobenzene sulfonyl) disulfide and 0.1% by weight of blood albumen as the dispersing agent, will in about 14 days show very marked signs of morphogenic changes, that is, these treated plants will have leaflets which are fused or partially fused instead of the usual and normal trifoliated leaves. It has been noted that bean plants having the former leaf structure have as mature plants produced higher yields of beans than the plants with normal leaf structure.

Although I have disclosed specific examples of the compositions of my invention together with specific examples of the use of these compositions, I do not, thereby, desire or intend to limit myself solely thereto, for, as hitherto stated, other members of the class of active ingredients disclosed can be used and the precise proportions of the materials employed in preparing the various plant growth regulating compositions can be varied without departing from the spirit and scope of this invention as defined in the appended claims.

I claim:

1. A plant growth regulant which comprises a compound having the formula $$Y-SO_2-(S)_n-SO_2-Y'$$

where Y and Y' are haloaryl radicals and where $n$ is an integer from one to four.

2. A plant growth regulant composition which comprises as an essential active ingredient 0.01% to 10% by weight of a compound having the formula $$Y-SO_2-(S)_n-SO_2-Y'$$

where Y and Y' are haloaryl radicals and where $n$ is an integer from one to four, and at least 90% by weight of an inert carrier for the active ingredient.

3. A plant growth regulant which comprises bis-(2,5-dichlorophenyl sulfonyl) monosulfide.

4. A plant growth regulant which comprises bis-(2,5-dichlorophenyl sulfonyl) disulfide.

5. A method of regulating plant cell growth which comprises applying to at least some of the cells of the plant structure, in a quantity sufficient to alter the growth characteristics of the plant, a composition containing as the essential active ingredient from 0.01 to 10% by weight of a haloaryl sulfonyl sulfide.

WILLIAM D. STEWART.

REFERENCES CITED

The following references are of record in the file of this patent:

UNITED STATES PATENTS

| Number | Name | Date |
|---|---|---|
| 2,440,206 | Mueller | Apr. 20, 1948 |